United States Patent Office 2,933,097
Patented Apr. 19, 1960

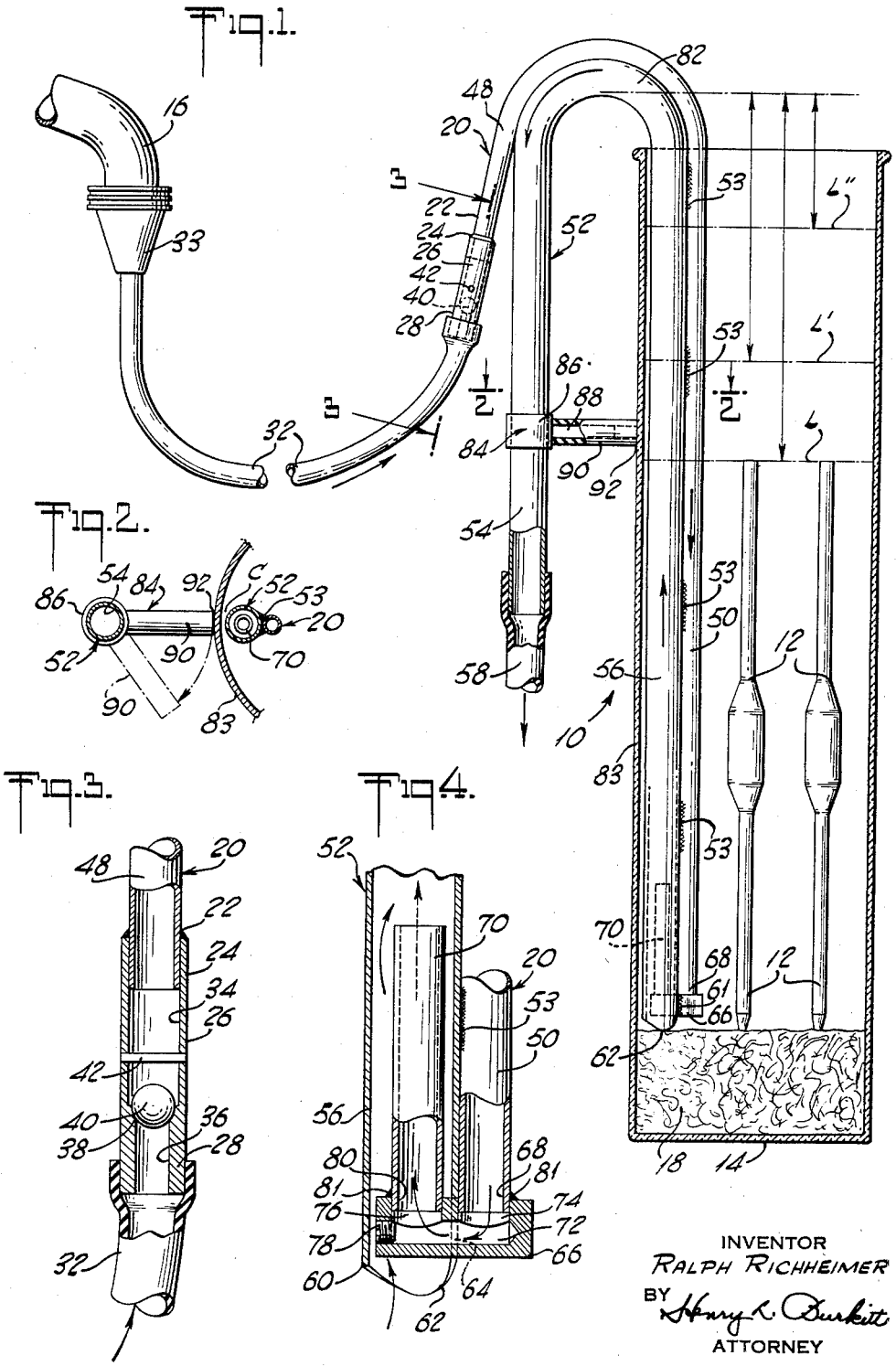

2,933,097

AUTOMATIC SIPHONIC WASHING APPARATUS

Ralph Richheimer, Flushing, N.Y., assignor to Belray Chemical Co., Inc., New York, N.Y., a corporation of New York Application February 4, 1957, Serial No. 637,930

8 Claims. (Cl. 137—132)

This invention relates to automatic washing apparatus. A particular application is in apparatus for washing and rinsing chemical glassware such as pipettes and the like, by periodically flushing such articles.

An object of the invention is to provide apparatus which may function to wash or rinse articles such as pipettes by repeated flushings, where a vessel to hold the pipettes is alternately filled and emptied as a part of a constantly repeating cycle, where such apparatus is reliable and foolproof in operation, and functions by a simple adjustment to accomplish its purpose.

Another object of the invention is to provide apparatus for the indicated purposes which is easily positioned in or removed from the vessel, and substantially supports itself in upright position and spaced from the walls of the vessel with but slight clearance.

Another object of the invention is to provide apparatus for the indicated purposes in which the components are assembled in a novel and simple manner into a device which is sturdy and may be manufactured economically.

Other objects of the invention will be set forth hereinafter, or will be apparent from the description and the drawings, in which is illustrated an embodiment exemplifying the invention.

The invention, however, is not intended to be restricted to any particular construction, or any particular arrangement of parts, or any particular application of any such construction or arrangement of parts, or any specific method of operation or use, or any of the various details thereof, even where specifically shown and described herein, as the same may be modified in various particulars, or may be applied in many varied relations, without departing from the spirit and scope of the claimed invention, of which the exemplifying embodiment, herein shown and described, is intended only to be illustrative, and only for the purpose of complying with the requirements of the statutes for disclosure of an operative embodiment, but not to show all the various forms and modifications in which the invention might be embodied.

On the drawings, in which the same reference characters refer to the same parts throughout, and in which is disclosed such a practical construction, Fig. 1 is a vertical cross-sectional view of a vessel illustrating apparatus embodying features of the invention disposed therein, and shown in elevation, parts being broken away in section, the apparatus being shown connected to a water supply source;

Fig. 2 is a detail cross-sectional view, taken substantially on the line 2—2 of Fig. 1;

Fig. 3 is a detail cross-sectional view, to enlarged scale, taken substantially on the line 3—3 of Fig. 1; and Fig. 4 is a fragmentary detail vertical cross-sectional view, to enlarged scale, of the injector end of the apparatus shown disposed in the vessel of Fig. 1, to illustrate the manner of interconnection of the component conduits.

On the drawings there is shown apparatus 10 which is designed to wash and rinse chemical glassware, such as pipettes 12, or the like, by repeated flushings. Vessel 14, in which the pipettes may be arranged, is repeatedly and alternately filled and emptied. The supply of water to fill the vessel is obtained from a suitable water supply source, such as water tap 16. The emptying is effected by an automatic siphon, to be described, the flow from which is initiated when a predetermined head is reached in the vessel. Pipettes 12 are washed and rinsed by repeated flushings of the external and internal surfaces thereof, while the pipettes are supported in vessel 14 in upright position by any suitable means. A pad 18 may be disposed in the bottom of vessel 14. The vessel may be of glass, or any other suitable material. Pad 18 may be of any soft shock absorbing material such as felt, glass wool, or the like.

Apparatus 10 may comprise a tube or conduit 20 which may be of metal, and may be bent into a U-shape or a J-shape. One end 22 of conduit 20 is fitted into the end 24 of a metal fitting 26, and is secured thereto by any suitable method such as welding, brazing or the like. The other end 28 of fitting 26 may be connected to water tap 16 by means of a flexible inlet conduit 32 of any suitable material. Conduit 32 may be provided with an adapter 33 which is adapted for releasable connection to a range of tap sizes and types, and is here shown connected to tap 16.

Fitting 26 has a pair of bores 34 and 36 of different sizes or diameters. Bore 36 is shown as having a valve seat 38 for a ball valve member 40. On the flow of water through the fitting to conduit 20, valve member 40 is forced off its seat to permit liquid to flow through conduit 20 to the vessel. A suitable limit is generally desirable to retain valve member 40 so that it will not interfere with that flow. For that purpose, a stop pin 42 may be positioned to extend transversely of fitting 26, being suitably secured at its opposite ends in the walls of the fitting. It will be apparent that valve member 40 seats on valve seat 38 effectively to prevent reverse flow from conduit 32 to tap 16.

Conduit 20 has short and long legs 48 and 50. Conduit 20 is secured to a companion conduit 52 which is of larger diameter and is complementary in its configuration to that of conduit 20 so that conduits 20 and 52 may assume the adjacent nested relation shown in Fig. 1. The two conduits 20 and 52 may be secured to each other in any suitable manner, as, for instance, by spot welding 53, or by brazing adjacent wall surfaces to each other at one or more points along the length thereof.

Conduit 52 is provided as a part of a siphon conduit for emptying the liquid contents from the vessel on commencement of siphon action. Conduit 52 has short and long legs 54 and 56, which may be substantially parallel to each other. Leg 54 is made effective for siphoning action by the addition of a length 58 of flexible tubing which is disposed to extend below the lowermost extremity of leg 56, to a suitable drain.

The lower end 60 of leg 56 is open, and may terminate in edge 62 which is intended to rest upon some means, such as pad 18, when apparatus 10 is positioned in the vessel as shown in Fig. 1. Edge 62 may be given a suitable shaping, as, for instance, the arcuate shaping shown in Fig. 4. The end 60 of leg 56 is slotted, as indicated at 64, for the extension therethrough of a header 66.

Header 66 interconnects end 68 of leg 50 with an injector conduit or nozzle 70. Nozzle 70 is disposed within leg 56 in spaced relation to the walls thereof to leave a free passage between the nozzle and the inner walls of leg 56, since nozzle 70 is of substantially smaller diameter than leg 56. Nozzle 70 extends upwardly in leg 56 from header 66 for a short distance (Fig. 1). Header 66 may be provided with a passage or bore 72 between a pair of ports 74 and 76. Passage 72 may be formed by drilling header 66 past port 74 from one side, and then closing the opening at that side by a threaded plug 78.

End 68 of leg 50 and end 80 of conduit 70 are seated in ports 74 and 76, respectively, and are sealed in position in any suitable manner, as, for example, by means of welding or brazing 81. Header 66 may also be brazed or welded to leg 56 at 61 where the header extends through slot 64, to produce a rigid structure for nozzle 70 and legs 50 and 56. Nozzle 70 is thus in fluid communication with conduit 20, and discharges liquid into leg 56. From leg 56, the liquid flows down between nozzle 70 and leg 56, and into the vessel through the slot and past the shaped edge 62, and also builds up a head in leg 56 higher than the level in vessel 14 according to the pressure on nozzle 70. This relationship continues until siphon flow ensues when the head reaches bend 82, whereupon liquid flows up leg 56 from the vessel and out tubing 58 to the drain.

In order to support apparatus 10 in upright position, with leg 56 disposed in vessel 14 in spaced relation to sidewalls 83, and to provide slight clearance C, there is provided a rotatable spacer device 84 (Figs. 1 and 2) which may include a sleeve 86 slidably and rotatably engaged on leg 54. Sleeve 86 has a laterally projecting pin 88 upon which is disposed a length of flexible tubing 90. Device 84 is rotatable so that its outer end 92 abuts walls 83 of the vessel. In this relation, leg 56 within the vessel will be spaced slightly from walls 83.

In practice, the water pressure is adjusted at tap 16 to determine the level the liquid in the vessel is to reach before siphon flow to empty the vessel may commence. Thus the maximum level of liquid in the vessel is made a function of the water inlet pressure; the greater the pressure applied at nozzle 70, the lower will be this maximum level which will be reached in the vessel prior to siphon flow.

For example, if level L (Fig. 1) corresponds to a high water inlet pressure, L' corresponds to a lower water inlet pressure, and L'' corresponds to a still lower water inlet pressure. The water inlet pressure at nozzle 70 creates a pressure head in leg 56; when the pressure head in leg 56 reaches and fills bend 82, siphoning is initiated, and the vessel will be emptied. When the level in the vessel falls below slot 64, the siphon will "break," and the vessel-filling phase of the cycle will commence. Thus the vessel will repeatedly be alternately filled to the desired level with fresh water, and then emptied of wash water, repeatedly to flush the pipettes with fresh liquid for the desired interval.

Many other changes could be effected in the particular constructions, and in the methods of use and construction, and in specific details thereof, hereinbefore set forth, without substantially departing from the invention intended to be defined herein, the specific description being merely of an embodiment capable of illustrating certain principles of the invention.

What is claimed as new and useful is:

1. Apparatus for alternately filling and emptying a vessel as a regularly repetitive cycle, comprising a siphon to be positioned at will in association with a vessel, the siphon comprising an inlet conduit and an outlet conduit spaced apart and disposed in predetermined fixed relation and having a passage connection at their upper ends, the outlet conduit being longer than the inlet conduit, an injection conduit having its outlet disposed at the lower end of said inlet conduit, said injection conduit outlet being smaller than and fitting into the lower end of the inlet conduit to permit passage of liquid between the outlet and said lower end, said inlet lower end being open, said inlet conduit being positioned in the vessel and being of a length to rest its lower end directly upon the effective bottom of the vessel, the inlet conduit being open through said passage connection to the outlet conduit positioned outside the vessel for emptying the vessel by siphon flow through the outlet conduit when the pressure head in said inlet conduit reaches a predetermined level, the inlet conduit having a slot formed at and extending upwardly from said inlet conduit lower end, and means for interconnecting said injection conduit with a source of liquid under pressure comprising a header member extending through said slot and spaced upwardly from said inlet conduit lower end, whereby liquid flowing upwardly from the injection conduit in the inlet conduit also flows downwardly between the injection conduit outlet and said inlet conduit lower end and through said slot into the vessel to raise the head in the vessel until said pressure head in the inlet conduit reaches said predetermined level.

2. Apparatus for alternately filling and emptying a vessel as a regularly repetitive cycle, comprising a siphon to be positioned at will in association with a vessel, the siphon including a siphon conduit having inlet and outlet sections spaced apart in a predetermined fixed relation and having a passage connection between their upper ends, the inlet section being shorter than the outlet section, the siphon conduit being adapted to be positioned with the inlet section within the vessel and the outlet section outside the vessel and the passage connection extending over the upper edge of the vessel, the inlet section being of a length to rest its lower end directly upon the effective bottom of the vessel, an injection conduit closely following the contour of said siphon conduit from the passage connection to said lower end, the inlet section having an opening through the walls thereof extending upwardly from said lower end, a duct within and spaced from the walls of the inlet section, the duct extending a short distance upwardly in the inlet section, and means for interconnecting said injection conduit and said duct to cause a stream of water to be directed from the duct upwardly through the inlet section and also downwardly between the inlet section and the duct and through said opening into the vessel in accordance with the head of water established by said stream in said inlet section, the interconnecting means including a header extending through said opening, said injection conduit and duct meeting the header substantially at right angles, whereby the pressure head built up in the inlet section by the stream from the duct will determine the head of water to be established in the vessel before which siphon flow from the vessel through the inlet section will commence.

3. Apparatus for alternately filling and emptying a vessel as a regularly repetitive cycle, comprising a siphon to be positioned at will in association with a vessel, the siphon including a siphon conduit having inlet and outlet sections spaced apart in a predetermined fixed relation and having a passage connection between their upper ends, the inlet section being shorter than the outlet section, the siphon conduit being adapted to be positioned with the inlet section within the vessel and the outlet section outside the vessel and the passage connection extending over the upper edge of the vessel, the inlet section being of a length to rest its lower end directly upon the effective bottom of the vessel, an injection conduit closely following the contour of said siphon conduit from the passage connection to said lower end, the inlet section having an opening through the walls thereof extending upwardly from said lower end, a duct within and spaced from the walls of the inlet section, the duct extending a short distance upwardly in the inlet section, and means providing liquid communication between said injection conduit and said duct to cause a stream of water to be directed from the duct upwardly through the inlet section and also downwardly between the inlet section and the duct and through said opening into the vessel in accordance with the head of water established by said stream in said inlet section, the fluid communication means including a header extending through and being secured in said opening, said header having a transverse passage and a pair of passages extending upwardly from and having fluid communication with said transverse passage, the upwardly extending passages being disposed on opposite sides of the wall of the inlet section through which the header extends, said injection conduit and said duct being connected to said pair of passages, whereby the pressure head built up in the inlet section by the stream from the duct will determine the head of water to be established in the vessel before which siphon flow from the vessel through the inlet section will commence.

4. Apparatus for alternately filling and emptying a vessel as a regularly repetitive cycle, comprising a siphon to be positioned at will in association with a vessel, the siphon including a siphon conduit having inlet and outlet sections spaced apart in a predetermined fixed relation and having a passage connection between their upper ends, the inlet section being shorter than the outlet section, the siphon conduit being adapted to be positioned with the inlet section within the vessel and the outlet section outside the vessel and the passage connection extending over the upper edge of the vessel, the inlet section being of a length to rest its lower end directly upon the effective bottom of the vessel, an injection conduit closely following the contour of said siphon conduit from the passage connection to said lower end, the inlet section having an opening through the walls thereof extending upwardly from said lower end, a duct within and spaced from the walls of the inlet section, the duct extending a short distance upwardly in the inlet section, and means for interconnecting said injection conduit and said duct to cause a stream of water to be directed from the duct upwardly through the inlet section and also downwardly between the inlet section and the duct and through said opening into the vessel in accordance with the head of water established by said stream in said inlet section, the interconnecting means including a header extending through said opening and having said injection conduit and duct meeting the header substantially at right angles, whereby the pressure head built up in the inlet section by the stream from the duct will determine the head of water to be established in the vessel before which siphon flow from the vessel through the inlet section will commence, said injection conduit and said duct being of substantially smaller bore than said inlet conduit.

5. Apparatus for alternately filling and emptying a vessel as a regularly repetitive cycle, comprising a siphon to be positioned at will in association with a vessel, the siphon including a siphon conduit having inlet and outlet sections spaced apart in a predetermined fixed relation and having a passage connection between their upper ends, the inlet section being shorter than the outlet section, the siphon conduit being adapted to be positioned with the inlet section within the vessel and the outlet section outside the vessel and the passage connection extending over the upper edge of the vessel, an injection conduit closely following the contour of said siphon conduit from the passage connection to the lower end of the inlet section, the inlet section having an opening through the walls thereof extending upwardly from said lower end, a duct extending a short distance upwardly within the inlet section above the opening, the duct being spaced from the walls of the inlet section, and means providing liquid communication between said injection conduit and said duct to cause a stream of water to be directed from the duct upwardly through the inlet section and also downwardly between the inlet section and the duct and through said opening into the vessel in accordance with the head of water established by said stream in said inlet section, the fluid communication means including a header extending through and being secured in said opening, said header member having a transverse drilled passage and a pair of passages extending upwardly from and having liquid communication with said transverse passage, the upwardly extending passages being disposed on opposite sides of the wall of the inlet section through which the header extends, said injection conduit and said duct being connected to said pair of passages, whereby the pressure head built up in the inlet section by the stream from the duct will determine the head to be established in the vessel before which siphon flow from the vessel through the inlet section will commence, the walls of said inlet section projecting below said header to define an open passage between said inlet section and the vessel, said siphon conduit being adapted to be supported in upright disposition with said projecting walls of the inlet section disposed on a support at the bottom of the vessel.

6. Apparatus for alternately filling and emptying a vessel as a regularly repetitive cycle, comprising siphon and injection conduits secured to each other in nested surface-to-surface relation, each of said conduits having short and long legs with the latter being adapted to be supported within the vessel in upright disposition, the siphon conduit having means to extend its short leg to a level below the lowermost point of the long leg, a relatively short injection duct disposed at and within and spaced from the walls of the lower end of the siphon long leg and providing liquid communication between said siphon and injection conduits, said siphon conduit being open at the opposite ends thereof for filling the vessel from said injection conduit through one end and for emptying the vessel by siphon flow through the opposite end when the pressure head in the siphon conduit long leg reaches a predetermined amount, the siphon conduit long leg being of a length to rest its lower end directly upon the effective bottom of the vessel, said lower end having a slot extending through the wall of said siphon conduit long leg upwardly from the lower end, means extending through said slot and spaced upwardly from said lower end for interconnecting the injection conduit long leg and the duct, and means for supporting the siphon and injection conduits in upright disposition with said long legs disposed within and in predetermined spaced relation to the side walls of the vessel, said lower end being shaped to define with the vessel bottom a passage providing liquid communication between the siphon conduit long leg and the vessel.

7. Apparatus for alternately filling and emptying a vessel as a regularly repetitive cycle, comprising siphon and injection conduits secured to each other in nested surface-to-surface relation, each of said conduits having short and long legs with the latter being adapted to be supported within the vessel in upright disposition, the siphon conduit having means to extend its short leg to a level below the lowermost portion of the long leg, a relatively short injection duct disposed at and within and spaced from the walls of the lower end of the siphon long leg and providing liquid communication between said siphon and injection conduits, said siphon conduit being open at the opposite ends thereof for filling the vessel from said injection conduit through one end and for emptying the vessel by siphon flow through the opposite end when the pressure head in the siphon conduit long leg reaches a predetermined amount, the siphon conduit long leg being of a length to rest its lower end directly upon the effective bottom of the vessel, said lower end having a slot extending through the wall of said siphon conduit long leg upwardly from said lower end, means extending through said slot and spaced upwardly from said lower end for interconnecting the injection conduit long leg and the duct, said means comprising a header having a transverse passage, and a pair of passages extending upwardly from and having liquid communication with said transverse passage, the upwardly extending passages being disposed on opposite sides of said wall, said pair of passages being connected to said siphon conduit long leg and said duct, whereby the pressure head built up in the siphon conduit long leg by the stream from the duct will determine the head in the vessel at which siphon flow from the vessel through the inlet section will commence.

8. Apparatus for alternately filling and emptying a vessel as a regularly repetitive cycle, comprising siphon and injection conduits secured to each other in nested surface-to-surface relation, each of said conduits having short and long legs with the latter being adapted to be supported within the vessel in upright disposition, the siphon conduit having means to extend its short leg to a level below the lowermost portion of the long leg, a relatively short injection duct disposed at and within and spaced from the walls of the lower end of the siphon long leg and providing liquid communication between said siphon and injection conduits, said siphon conduit being open at the opposite ends thereof for filling the vessel from said injection conduit through one end and for emptying the vessel by siphon flow through the opposite end when the pressure head in the siphon conduit long leg reaches a predetermined amount, the siphon conduit long leg being of a length to rest its lower end directly upon the effective bottom of the vessel, said lower end having a slot extending through the wall of said siphon conduit long leg upwardly from said lower end, means extending through said slot and spaced upwardly from said lower end for interconnecting the injection conduit long leg and the duct, said means comprising a header having a transverse passage and a pair of passages extending upwardly from and having liquid communication with said tranverse passage, the upwardly extending passages being disposed on opposite sides of said wall, said pair of passages being connected to said siphon conduit long leg and said duct, whereby the pressure head built up in the siphon conduit long leg by the stream from the duct will determine the head in the vessel at which siphon flow from the vessel through the inlet section will commence, and adjustable means for supporting said conduits in upright disposition with said long legs within the vessel in predetermined spaced relation to the side walls of the vessel.

References Cited in the file of this patent

UNITED STATES PATENTS

| Re. 11,215 | Murphy et al. | Dec. 29, 1891 |
| 1,618,362 | Allman | Feb. 22, 1927 |
| 2,455,523 | Rodack | Dec. 7, 1948 |
| 2,524,581 | Weiskopf | Oct. 3, 1950 |

FOREIGN PATENTS

| 20,810 | Australia | June 19, 1930 |